United States Patent
Okuda et al.

(10) Patent No.: US 6,789,095 B2
(45) Date of Patent: Sep. 7, 2004

(54) FILE MANAGEMENT METHOD, PROGRAM THEREFORE, RECORDING MEDIUM CONTAINING THE PROGRAM, AND FILE MANAGEMENT APPARATUS FOR PERFORMING THE METHOD

(75) Inventors: Hiroyuki Okuda, Kanagawa (JP); Hideyuki Ishihara, Chiba (JP); Shigeru Tanaka, Kanagawa (JP); Masahiro Okuno, Kanagawa (JP); Tomohisa Takaoka, Kanagawa (JP)

(73) Assignee: Sony Corporation, Tokyo (JP)

( * ) Notice: Subject to any disclaimer, the term of this patent is extended or adjusted under 35 U.S.C. 154(b) by 394 days.

(21) Appl. No.: 10/103,699

(22) Filed: Mar. 25, 2002

(65) Prior Publication Data

US 2002/0138781 A1 Sep. 26, 2002

(30) Foreign Application Priority Data

Mar. 26, 2001 (JP) ........................................ 2001-086654

(51) Int. Cl.$^7$ ............................................. G06F 12/00
(52) U.S. Cl. ............................ 707/200; 707/1; 707/100
(58) Field of Search .............................. 707/100–104.1, 707/1–10, 200–205; 345/700, 764, 810, 839, 835–836, 853–854, 775, 804, 781, 848; 715/511, 500, 530–531; 340/5.1–5.26; 380/28; 713/164–167, 150, 100

(56) References Cited

U.S. PATENT DOCUMENTS

| | | | | |
|---|---|---|---|---|
| 5,065,347 A | * | 11/1991 | Pajak et al. | 345/835 |
| 5,787,445 A | * | 7/1998 | Daberko | 707/205 |
| 5,799,212 A | * | 8/1998 | Ohmori | 710/73 |
| 5,819,295 A | * | 10/1998 | Nakagawa et al. | 707/203 |
| 6,240,421 B1 | * | 5/2001 | Stolarz | 707/102 |
| 6,263,330 B1 | * | 7/2001 | Bessette | 707/4 |
| 6,314,434 B1 | * | 11/2001 | Shigemi et al. | 707/203 |
| 6,424,429 B1 | * | 7/2002 | Takahashi et al. | 358/1.16 |
| 6,578,049 B1 | * | 6/2003 | Adolph et al. | 707/104.1 |
| 6,598,049 B1 | * | 7/2003 | Moriyama | 707/100 |
| 6,625,626 B1 | * | 9/2003 | Haneda | 707/205 |
| 6,741,996 B1 | * | 5/2004 | Brechner et al. | 707/102 |

* cited by examiner

Primary Examiner—Greta Robinson
Assistant Examiner—Linh Black
(74) Attorney, Agent, or Firm—Oblon, Spivak, McClelland, Maier & Neustadt, P.C.

(57) ABSTRACT

A file management method displays representations of files belonging to a predetermined folder and representations of files belonging to a subfolder of the predetermined folder in a virtual form in which the representations of the files belonging to the predetermined folder and the representations of the files belonging to the subfolder belong to a single folder so that the file of desired content can be easily and securely found. The file management method, a program for performing the file management method, a recording medium containing the program, and a file management apparatus are intended for use in car-mounted apparatuses.

12 Claims, 5 Drawing Sheets

(A)

(B)

ADDRESSES ON MEMORY

ADDRESS INFORMATION

FILE MANAGEMENT METHOD, PROGRAM THEREFORE, RECORDING MEDIUM CONTAINING THE PROGRAM, AND FILE MANAGEMENT APPARATUS FOR PERFORMING THE METHOD

BACKGROUND OF THE INVENTION

1. Field of the Invention

The present invention relates to a file management method, a program therefor, a recording medium containing the program, and a file management apparatus for performing the method, and can be applied to, for example, car-mounted apparatuses which play back optical disks created by personal computers, etc. The present invention makes it possible to easily and securely find a file of desired content, or the like, by displaying representations of files belonging to a predetermined folder and representations of files belonging to a subfolder of the folder in a virtual form in which the files belonging to the predetermined folder and the files belonging to the subfolder belong to a single folder.

2. Description of the Related Art

In a car-mounted audio apparatus of the related art, a compact disk can be played back.

A personal computer can obtain and store a file of desired music content by accessing a server for music content distribution, and can record the music content file on a compact disk recordable (CD-R) and a compact disk rewritable (CD-RW).

When the personal computer records the music content file on the CD-R or CD-RW, the file is recorded in a data-compressed form in many cases, and this can record a large quantity of music content on a single CD-R. In addition, by using a layered structure composed of folders having genre names, artist names, etc., a large number of files can be recorded. This makes it possible to easily and securely select desired music content by operating the personal computer.

If files of variously compressed music content for use in the personal computer are played back also by the car-mounted audio apparatus, CD-Rs and CD-RWs having content recorded by personal computers can be enjoyed in a car.

The personal computers use a layered structure of folders to manage files, while car-mounted apparatuses have a defect in that it cannot display such a layered structure on a large screen differently from the personal computers since it has a relatively small display unit. In personal computer file management using the layered structure, in order to select a desired file, the personal computer must sequentially follow subfolders from an upper folder, and must select the desired file by using files of various software applications. Accordingly, in the case of enjoying with the car-mounted apparatus CD-Rs and CD-RWs having content recorded by personal computers, it is difficult to easily and securely find the file of desired content.

In particular, since a driver must concentrate on driving, it is difficult for the driver to operate the car-mounted apparatus in order to enjoy a CD-R or CD-RW having computer-recorded content, and in the worst case, the operation of the car-mounted apparatus may cause an accident.

SUMMARY OF THE INVENTION

In view of the above circumstances, the present invention is made and an object thereof is to provide a file management method, a program therefor, a recording medium containing the program, and a file management apparatus for performing the method.

To this end, according to an aspect of the present invention, a file management method for accessing a recording unit in which files are recorded in a layered structure is provided. The file management method includes an address-information acquisition step for acquiring from the recording unit first information on the addresses in the layered structure of files belonging to a predetermined folder and second information on the addresses in the layered structure of files belonging to a subfolder of the predetermined folder, a display step for, based on the first information and the second information, displaying representations of the files belonging to the predetermined folder and representations of the files belonging to the subfolder in a virtual form in which the files belonging to the predetermined folder and the files belonging to the subfolder belong to a single folder, and a selected-file acceptance step for using the screen displayed by the display step to accept a file selected from among the files belonging to the predetermined folder and the files belonging to the subfolder.

According to another aspect of the present invention, a program for performing a file management method for accessing recording unit in which files are recorded in a layered structure is provided. The file management method includes an address-information acquisition step for acquiring from the recording unit first information on the addresses in the layered structure of files belonging to a predetermined folder and second information on the addresses in the layered structure of files belonging to a subfolder of the predetermined folder, a display step for, based on the first information and the second information, displaying representations of the files belonging to the predetermined folder and representations of the files belonging to the subfolder in a virtual form in which the files belonging to the predetermined folder and the files belonging to the subfolder belong to a single folder, and a selected-file acceptance step for using the screen displayed by the display step to accept a file selected from among the files belonging to the predetermined folder and the files belonging to the subfolder.

According to another aspect of the present invention, a recording medium containing a program for performing a file management method for accessing recording unit in which files are recorded in a layered structure is provided. The file management method includes an address-information acquisition step for acquiring from the recording unit first information on the addresses in the layered structure of files belonging to a predetermined folder and second information on the addresses in the layered structure of files belonging to a subfolder of the predetermined folder, a display step for, based on the first information and the second information, displaying representations of the files belonging to the predetermined folder and representations of the files belonging to the subfolder in a virtual form in which the files belonging to the predetermined folder and the files belonging to the subfolder belong to a single folder, and a selected-file acceptance step for using the screen displayed by the display step to accept a file selected from among the files belonging to the predetermined folder and the files belonging to the subfolder.

According to another aspect of the present invention, a file management apparatus for accessing recording unit in which files are recorded in a layered structure is provided. The file management apparatus includes an address-information acquisition unit for acquiring from the recording unit first information on the addresses in the layered structure of files belonging to a predetermined folder and second information on the addresses in the layered structure of files belonging to a subfolder of the predetermined folder, a display unit for, based on the first information and the second information, displaying representations of the files belonging to the predetermined folder and representations of the files belonging to the subfolder in a virtual form in which the files belonging to the predetermined folder and the files belonging to the subfolder belong to a single folder, and a file-selecting step for using the screen displayed by the display unit to accept a file selected from among the files belonging to the predetermined folder and the files belonging to the subfolder.

According to another aspect of the present invention, a file management method for downloading a desired file to a predetermined recording medium by accessing recording unit in which file are recorded in a layered structure is provided. The file management method includes the steps of acquiring from the recording unit first information on the addresses in the layered structure of files belonging to a predetermined folder and second information on the addresses in the layered structure of files belonging to a subfolder of the predetermined folder, and creating, based on the first and second information, folders respectively corresponding to the predetermined folder and the subfolder in a single layer in the recording medium, and recording on the recording medium files belonging to the predetermined folder and the subfolder.

According to the present invention, by displaying representations of the files belonging to the predetermined folder and representations of the files belonging to the subfolder in a virtual form in which the files belonging to the predetermined folder and the files belonging to the subfolder belong to a single folder, the file of desired content, etc., can be easily and securely found.

DESCRIPTION OF THE PREFERRED
EMBODIMENTS

Figure 2:
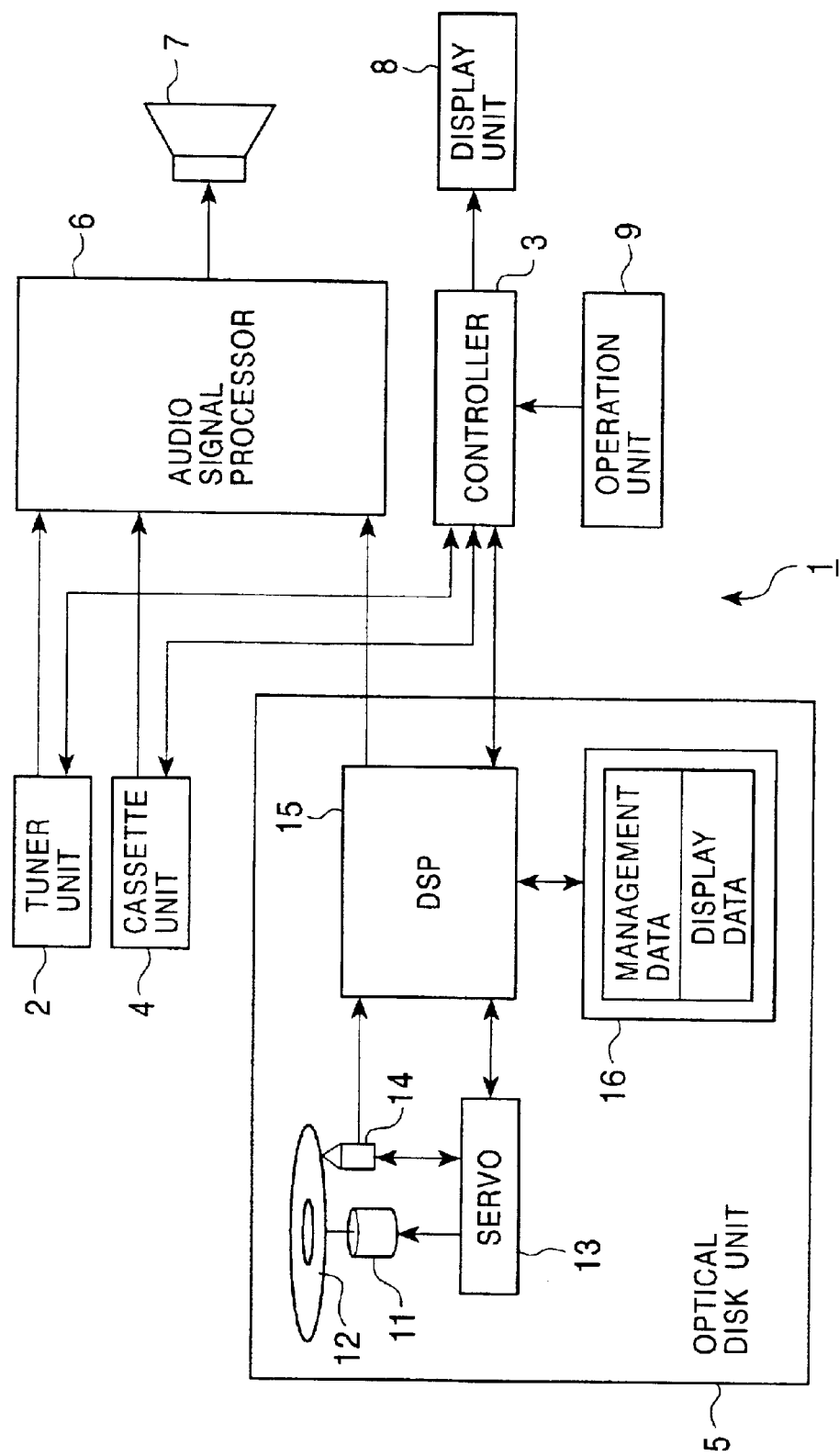
FIG. 2 is a block diagram showing a car audio apparatus including the digital signal processor described using FIG. 1.

Embodiments of the present invention are described below with reference to the accompanying drawings.
1. First Embodiment FIG. 2 is a block diagram showing a car audio apparatus 1 according to a first embodiment of the present invention. The car audio apparatus 1 enables a user to listen to music content from an FM broadcast, a tape cassette, and an optical disk.

Specifically, under control of a controller 3, a tuner unit 2 receives a desired broadcast and outputs an audio signal. Similarly, under control of the controller 3, a cassette unit 4 plays back an audio signal from a tape cassette and outputs the signal. Similarly, under control of the controller 3, an optical disk unit 5 plays back an audio signal from an optical disk 12 as a CD, CD-R, or CD-RW and outputs the signal.

Under control of the controller 3, an audio signal processor 6 amplifies the audio signal that is output from the tuner unit 2, the cassette unit 4, or the optical disk unit 5 while correcting the tone quality and sound volume of the signal, and drives a speaker 7. This enables the car audio apparatus 1 to play back various types of music content for use in listening.

A display unit 8 is made of, for example, a liquid crystal display panel, and is controlled by the controller 3 to display various menu screens and to display the volume, etc., in graphic form. An operation unit 9 includes a remote commander and a receiver that receives a remote control signal output by the remote commander and that notifies the controller 3 of the control signal.

The controller 3 controls the operation of the entirety of the car audio apparatus 1. In response to a notification from the operation unit 9 and to a notification from the optical disk 5, the controller 3 outputs control commands to the tuner unit 2, the cassette unit 4, the optical disk unit 5, and the display unit 8. Each control command switches the operation of the car audio apparatus 1 in response to a user's operation. Accordingly, with the car audio apparatus 1, for example, by operating the remote commander of the operation unit 9 to select a desired music and also to designate playing of the selected music while seeing a screen including music names, which is displayed on the display unit 8, the user can instruct the optical disk unit 5 to play the corresponding music.

In the optical disk unit 5, a spindle motor 11 controls a servo circuit 13 to rotate the optical disk 12, which is loaded, at a predetermined rotation speed. The servo circuit 13 executes a spindle control process that controls the rotation of the spindle motor 11, and also controls tracking and focusing by controlling an optical pickup 14 to perform a seek operation.

The optical pickup 14 emits a laser beam onto the optical disk 12, receives reflected light, and outputs the light reception. The optical pickup 14 generates various signals, address information, and a clock signal that are necessary for the operation of the servo circuit 13 by using a signal processing circuit (not shown) to perform signal processing on the light reception. The generated signals, address information, and clock signal are output to the servo circuit 13. The optical pickup 14 generates a playback signal of which the level varies with pits and marks formed on the optical disk 12, and outputs, to a digital signal processor (DSP) 15, playback data obtained by processing the playback signal.

The digital signal processor 15 is a control circuit that controls the operation of the optical disk unit 5 and is also a digital signal processing circuit that processes the playback data output from the optical pickup 14. Under control of the controller 3, or when a detection mechanism (not shown) detects the loading of the optical disk 12, the digital signal processor 15 acquires the data required for accessing the optical disk 12 by using a predetermined process to control the operation of the servo circuit 13 so that the optical pickup 14 seeks in the lead-in area of the optical pickup 12.

The data required for accessing the optical disk 12 includes identification data representing the type of the optical disk 12, data on the title of the optical disk 12, and management data. In a case in which the optical disk 12 is a CD-R or a CD-RW containing various files created by the personal computer, the management data is data for managing files recorded on the optical disk 12 and includes a directory structure of the files, the names of the files, and the recording positions on the optical disk 12 of the files. In a case in which the optical disk 12 is a CD, the management data includes a table of contents and other data. The management data is consecutive data that is loaded from the optical disk 12 into a common computer-connected optical disk drive such as the optical disk unit 5 and is used to access the optical disk 12 In response to a command from the computer or a user's operation.

The digital signal processor 15 records the management data in a memory 16 with the identification data, etc. In this process, the digital signal processor 15 uses the process shown in FIG. 1 to process the management data, and retains display data based on the result of the process in the memory 16.

Figure 1:
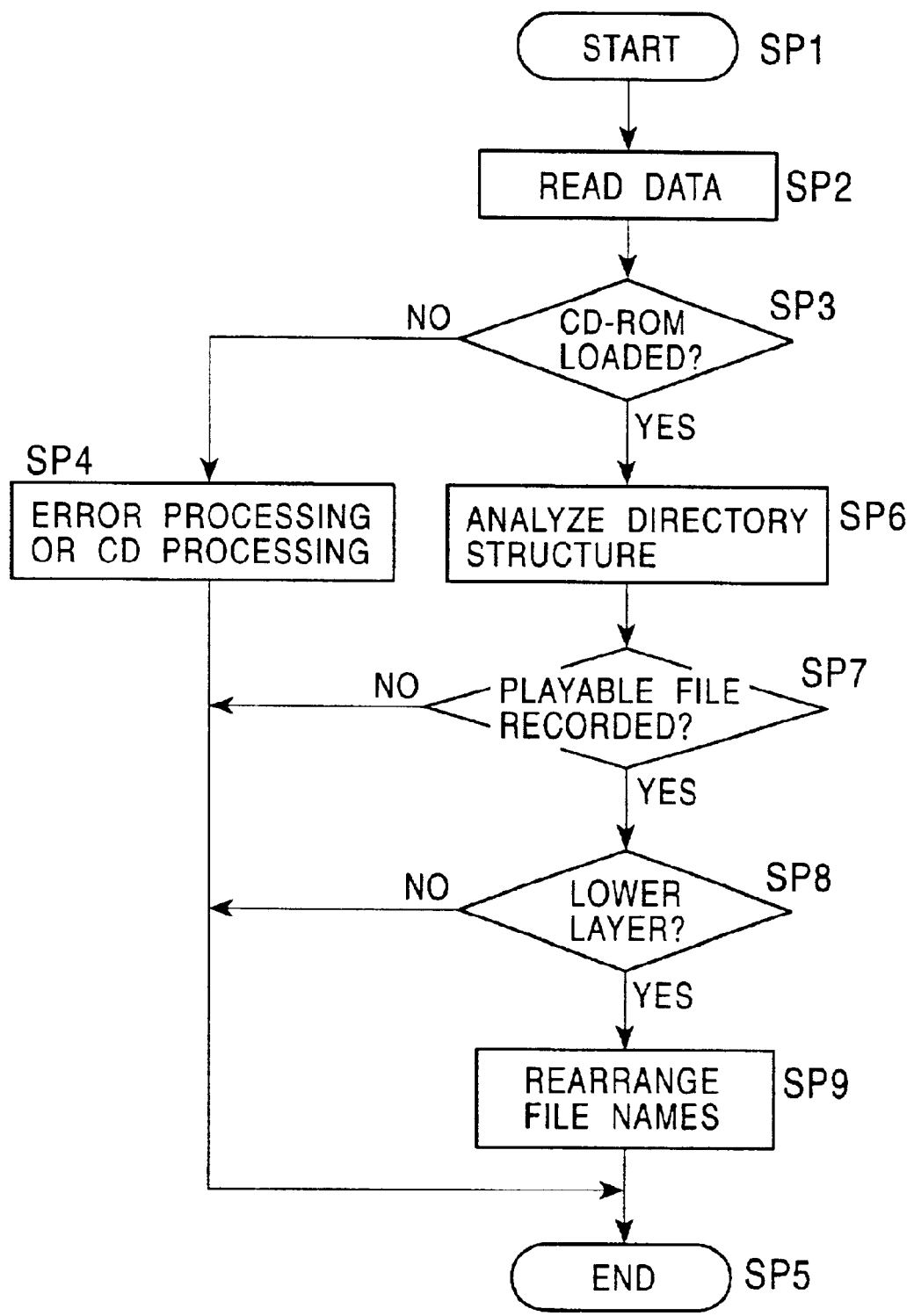
FIG. 1 is a flowchart showing a process of a digital signal processor in a car audio apparatus according to an embodiment of the present invention.

Referring to FIG. 1, the digital signal processor 15 starts in step SP1, and proceeds to step SP2. In step SP2, as described above, the digital signal processor 15 reads (plays back) the management data from the optical disk 12, and records the read management data in the memory 16. Proceeding to step SP3, based on the data representing the type of the optical disk 12, the digital signal processor 15 determines whether the optical disk 12 is a CD-R or a CD-RW (i.e., whether or not a CD-ROM has been loaded). If the digital signal processor 15 has negatively determined, it proceeds to step SP4. The digital signal processor 15 proceeds to step SP4 when, for example, a type of optical disk that cannot be played back is loaded, or when a CD is loaded.

In step SP4. when the optical disk that cannot be played back is loaded, the digital signal processor 15 notifies the controller 3 in order to display an error. After that, the digital signal processor 15 proceeds to step SP5 and ends the process. When the optical disk 12 is a common CD, the digital signal processor 15 executes processing for common CD in step SP4. After that, the digital signal processor 15 proceeds to step SP5 and ends the process. In the processing for common CD, the digital signal processor 15 notifies the controller 3 of a CD title, etc., and uses the controller 3 to display an album name, the number of tracks, etc.

In step SP3, if the digital signal processor 15 has affirmatively determined, it proceeds to step SP6 and analyzes the directory structure recorded on the optical disk 12 by analyzing the management data recorded in the memory 16.

After that, proceeding to step SP7, the digital signal processor 15 determines based on the result of the analysis whether or not a file that can be played back by the optical disk unit 5 is recorded on the optical disk 12. In the optical disk unit 5, the digital signal processor 15 can decompress audio data compressed in the MPEG Audio Layer-3 (MP3) format by the digital signal processor 15. In step SP7, by identifying the extension of each file, the digital signal processor 15 finds a file of audio data compressed in MP3 format.

When such a file of the compressed audio data is not found, the digital signal processor 15 notifies the controller 3 in order to display an error. After that, the digital signal processor 15 proceeds to step SP5 and ends the process. Conversely, when such a file has been detected, the digital signal processor 15 proceeds to step SP8 and determines whether or not the detected file belongs to a subfolder positioned at a lower layer (at a directory other than a root directory) in the layered structure.

Figure 3:
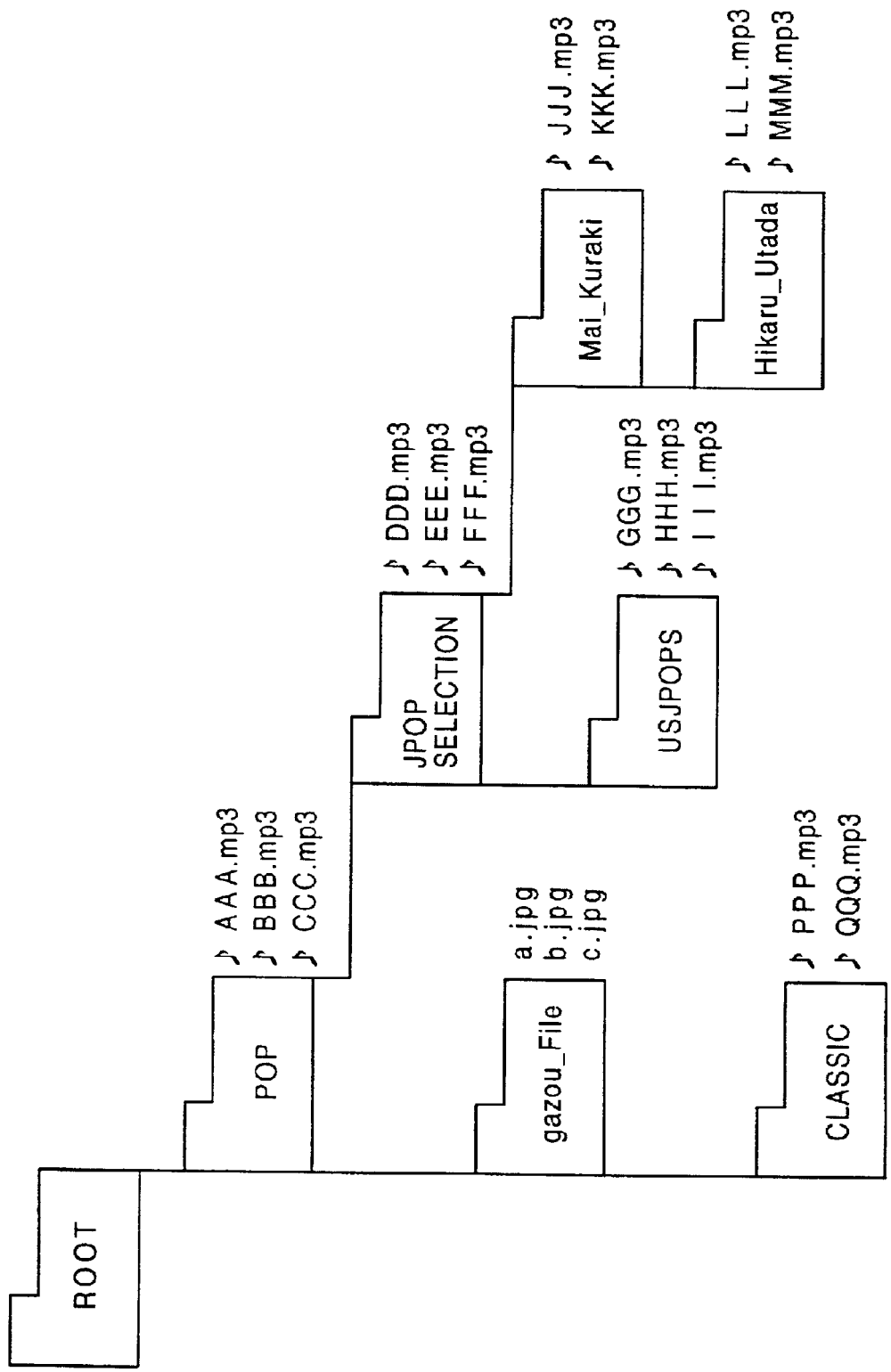
FIG. 3 is an illustration of a layered structure.
Figure 4:
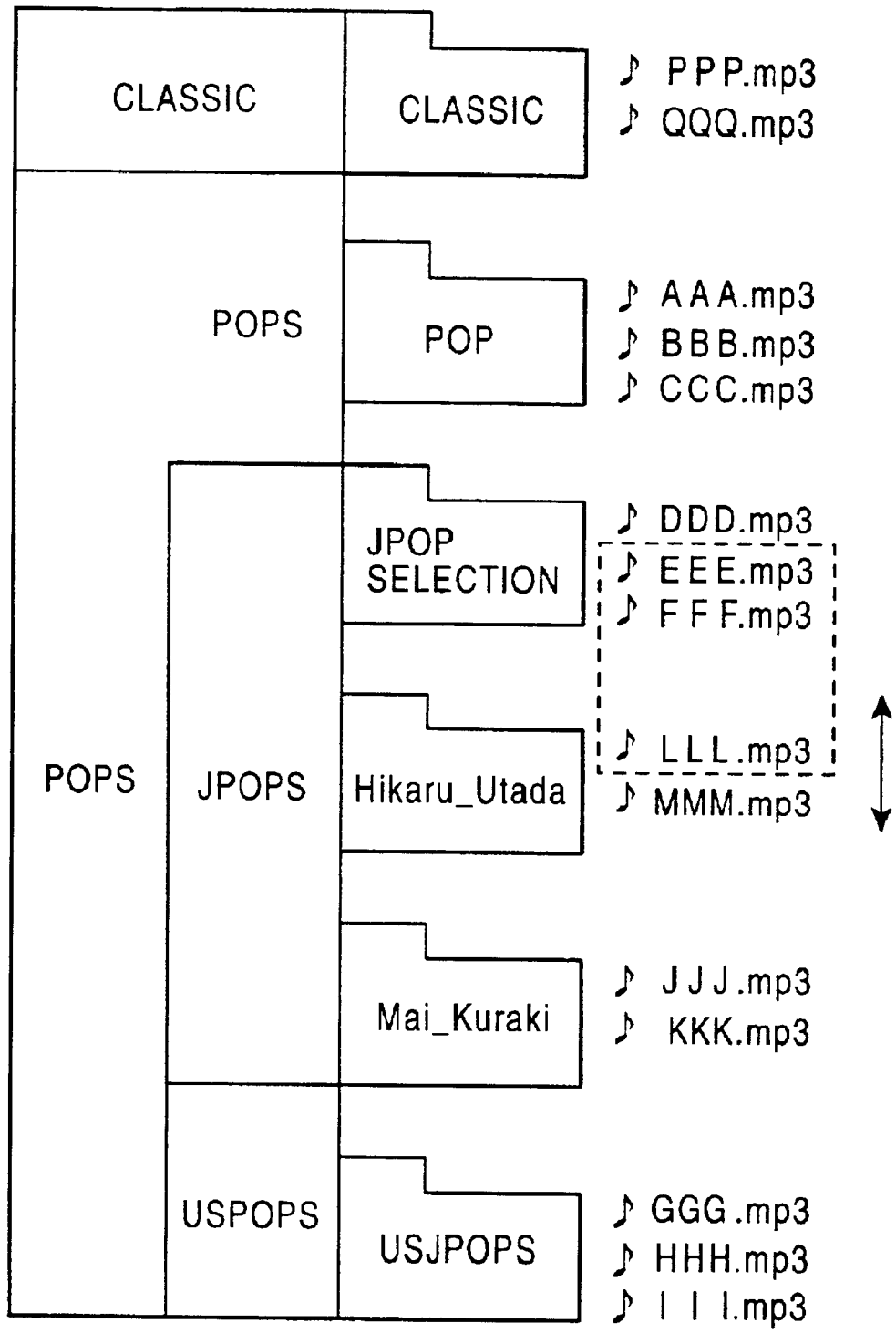
FIG. 4 is an illustration of the digital signal processor 15 described using FIG. 1.

If the digital signal processor 15 has affirmatively determined in step SP8, it proceeds to step SP9 and generates the display data by rearranging the file name information retained in the memory 16. In step SP9, the digital signal processor 15 generates the display data by writing in a form for a case in which the files are positioned in the root directory. Specifically, as FIG. 3 shows, it is assumed that folders having the file-genre representing names "POP", "gazou_File" (image file), and "CLASSIC" are created in the root directory on the optical disk 12, and it is assumed that subfolders having predetermined singer names (e.g., "Mai_Kuraki", "Hikaru_Utada") are created for a Japanese pop subfolder indicated by "JPOP SELECTION". In this case, it is also assumed that the folder "gazou_File" contains image data files "a.jpg", "b.jpg", and "c.jpg" and the other folders contain files of data compressed in the MP3 format. In step SP8, the digital signal processor 15 selects the file names assigned to the folders other than the folder "gazou_File", and generates selection data by selecting the files in a virtual form in which the selected files are positioned in the root directory, as the comparison between FIGS. 3 and 4 shows.

At this time, the digital signal processor 15 sequentially generates the selection data from the files in the root directory so that files assigned to each folder are sequentially arranged and that, ahead of files assigned to the other subfolders in the same layer, files assigned to lower-layer subfolders are first arranged. In other words, in the example shown in FIG. 3, between the CLASSIC folder and the POP folder, the CLASSIC folder contains files having the names "PPP.mp3" and "QQQ.mp3", and has no subfolders. Accordingly, the display data is generated so that the names "AAA.mp3", "BBB.mp3", and "CCC.mp3" of files belonging to the POP folder in the same layer are sequentially arranged.

In addition, since the POP folder contains lower subfolders named "JPOP SELECTION" (meaning Japanese pop) and "USJPOPS" (American pop), and subfolders at the same layer do not exist, the display data is generated so that files named "DDD.mp3", "EEE.mp3", and "FFF.mp3" of the JPOP SELECTION subfolder are sequentially arranged. Next, there is the USJPOPS subfolder in the layer of the JPOP SELECTION subfolder, and the JPOP SELECTION subfolder contains two lower subfolders having the names "Mai_Kuraki" and "Hikaru_Utada" which represent singers' names. Accordingly, the display data is generated so that, firstly, the files named "LLL.mp3" and "MMM.mp3" of one subfolder between the two lower subfolders are sequentially arranged, secondly, the files named "JJJ.mp3" and "KKK.mp3" of the other subfolder in the same layer, and finally, the files named "GGG.mp3", "HHH.mp3", and "III.mp3" of the USJPOPS subfolder are sequentially arranged.

The above setting of the folders enables the user to easily select files in the personal computer. In this embodiment, by using the names of files that can be played back, the display data is generated so that the purpose of the folders set by the user is reflected. After the digital signal processor 15 generates the display data, as described above, it proceeds to step SP5 and ends the process.

In a case in which all the files detected in step SP7 exist in the current directory, when the digital signal processor 15 obtains the negative determination in step SP8, it generates the display data based on the result of filtering in step SP7, and proceeds to step SP5.

After the digital signal processor 15 generates the display data and is instructed by the user to display the names of music recorded on the optical disk 12, the digital signal processor 15 posts the display data to the controller 3 in response to a request from the controller 3. The controller 3 uses the display unit 8 to display files names based on the display data, and switches the displayed file names in response to the operation of the remote commander. Since the screen area of the display unit 8 in the car audio apparatus 1 is limited, when the file names are displayed so as to be easily viewed by the user, the controller 3 uses the display unit 8 to display displayable file names corresponding to several pieces (three pieces in FIG. 4) of music in such a form that file names corresponding to several pieces of music are displayed in a display item range surrounded by the broken line in FIG. 4. As vertical scrolling (denoted by the bold arrows in FIG. 4) of the range shows, file names for display are sequentially switched in response to a user's operation.

The controller 3 also displays, among the file names displayed on the display unit 8, those displayed in a predetermined location so that they can distinguished from the other file names, for example, by displaying predetermined marks or using positive/negative inversion. When being instructed to perform the playback operation by the user, the controller 3 instructs the digital signal processor 15 to play back the files corresponding to the file names displayed in the predetermined location.

The digital signal processor 15 detects, in response to the instruction, corresponding management data based on relationship between the recorded display data and the management data, and initiates the playback operation by using the detected data to control the servo circuit 13. The digital signal processor 15 also sequentially generates audio data by processing, in a predetermined format the playback data output from the optical pickup 14, decompresses the audio data, and outputs the decompressed data in analog-to-digital converted form. Accordingly, in the car audio apparatus 1, the user can easily and securely select the desired file, even when accessing the optical disk 12 having files managed by the layered structure.

When the user instructs the car audio apparatus 1 to perform an automatic playback operation, the digital signal processor 15 is instructed by the controller 3 to play back a file containing the audio data sequentially recorded on the optical disk 12. At this time, the digital signal processor 15 controls the operation of the servo circuit 13 while sequentially acquiring corresponding management data in order to play back the optical disk 12 in the order of the files of the display data. Accordingly, in this embodiment, even when files in different layers are displayed in a virtual form in which they are positioned in a single layer, the optical disk 12 can be sequentially played back in accordance with the purposes of the layers set by the user.

2. Operation of Embodiment

In the above construction, in the car audio apparatus 1 (shown in FIG. 2), when the user operates the remote commander of the operation unit 9 to designate a radio broadcast, the controller 3 controls the tuner unit 2 to generate an audio signal by receiving the broadcast, and the audio signal is processed by the audio signal processor 6 and is output from the speaker 7. Also, when the user operates the remote commander of the operation unit 9 to designate playing of a tape cassette, the controller 3 controls the cassette unit 4 to generate an audio signal by playing back the tape cassette, and the audio signal is processed by the audio signal processor 6 and is output from the speaker 7.

When the user loads the optical disk 12 into the optical disk unit 5, under control of the digital signal processor 15, the type of the optical disk 12 is identified by playing back the lead-in area of the optical disk 12. In addition, when the optical disk 12 is a CD, the data of the TOC is recorded in the memory 16, and the title, etc., of the optical disk 12 is posted to the controller 3.

After loading the optical disk 12, as described above, when the user designates playing of the optical disk 12, the digital signal processor 15 controls, based on the data of the TOC that is recorded as management data in the memory 16, the optical disk 12 to be played back, and the resultant playback data is processed by the digital signal processor 15 to generate an audio signal. The audio signal is processed by the audio signal processor 6 and is output from the speaker 7. Accordingly, similarly to a common audio system, the car audio apparatus 1 enables the user to enjoy the radio broadcast, the tape cassette, and the CD.

When the optical disk 12 is a CD-R or a CD-RW having music content, etc., recorded by the personal computer, management data is played back and recorded in the memory 16 in the car audio apparatus 1. By processing the management data, only the names of files having a file format that can be decompressed by the optical disk unit 5 are recorded in the memory 16 (see FIGS. 3 and 4). At this time, the car audio apparatus 1 generates display data simply based on file names so that files assigned to different layers are arranged as if they are positioned in the root directory as a single layer. In addition, the display data is generated so that files assigned to a single folder are arranged as if their names are sequentially arranged and that lower subfolders are firstly arranged ahead of the other folders in the single layer.

When the car audio apparatus 1 is instructed by the user to select a file recorded on the optical disk 12, the display data generated as described above is output to the controller 3, and among many file names, only sequential file names that can be displayed on the display unit 8 are displayed on the display unit 8. The displayed file names can be switched such that the user operates the operation unit 9. Accordingly, in this embodiment, regarding a representation of each file name indicating each file, also files assigned to different layers are displayed as if they are arranged in the root directory as a single layer. In addition, the files of a single folder are displayed so that their names are sequentially arranged and that lower subfolders are firstly arranged ahead of the other folders in the single layer.

When the car audio apparatus 1 displays the file names, as described above, and is instructed by the user to perform the playback operation, a file playing operation, which is displayed in a predetermined position, is designated by the controller 3, and correspondence of display data corresponding to a displayed file name related to the designation is used to retrieve management data, and the file corresponding to the management data is played back. Specifically, in the car audio apparatus 1, audio data is generated such that the digital signal processor 15 generates audio data by processing in accordance with a CD-ROM format the playback data from the optical pickup 14, and decompressing the processed data. By converting the audio data from digital to analog form, an audio signal is generated.

This enables the user to select a desired file by simply scrolling the displayed items. For that, a file of desired content, etc., can be easily and securely found, even if the area of the display screen is limited.

In addition, by selectively displaying, from among the files recorded on the optical disk 12, a file or the like of the desired content can be easily and securely found.

At this time, in the car audio apparatus 1, by generating and displaying the display data so that it is sequentially arranged, and in preference to another folder in the same layer, by displaying a subfolder in a lower layer, the purpose of the layered structure by the user can be reflected in the representations of the files. This can improve usability for the user.

When the user instructs the car audio apparatus 1 to perform automatic playback, the car audio apparatus 1 sequentially accesses the optical disk 12 in the order of recording the display data, and plays back the audio signal. Also, in this case, the car audio apparatus 1 generates display data for files belonging to a single folder so that the display data is sequentially arranged, and in preference to the data of files belonging to another subfolder in a single layer, displays the data of files belonging to a subfolder in a layer lower than the single layer, whereby user's Intention can be reflected when playing back music, even when automatic playback is performed. This can improve usability for the user.

3. Effects of Embodiment

According to the above construction, regarding file names as representations of files, by displaying the names of files belonging to a predetermined folder and the names of files belonging to a subfolder of the predetermined folder in a virtual form in which the names of the files belonging to the predetermined folder and the names of the files belonging to the subfolder belong to a single folder, the file of desired content, etc., can be easily and securely found.

At this time, by selectively displaying a playable predetermined-format file from files recorded on the optical disk 12, the file of desired content, etc., can be easily and securely found.

Regarding files belonging to a single folder, by displaying the files so that they are sequentially arranged, and displaying, in preference to another folder in the same layer, a subfolder in a lower layer, the purpose of the layered structure by the user can be reflected in the representations of the files. This can improve usability for the user.

In addition, in the automatic playback, also by sequentially playing back the files in the order of displaying the file names, the files can be played back in accordance with user's intention. This can improve usability for the user.

4. Other Embodiments

In the above embodiment, a case in which the display data is generated when the optical disk 12 is loaded has been described. However, the present invention is not limited to the case. For example, in such a case that the display data is generated when power is supplied, the display data is generated as required, so that effects similar to those in the above embodiment can be obtained.

Figure 5:
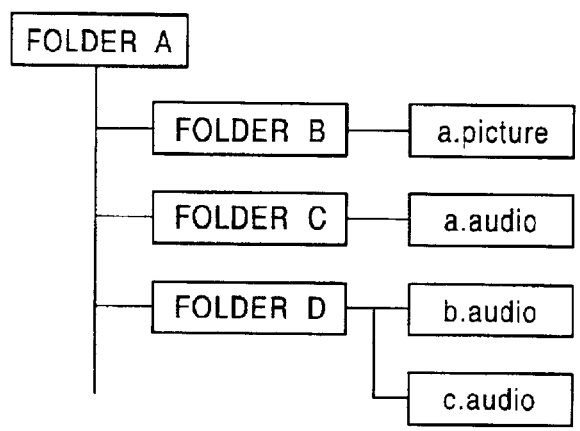
FIG. 5 is an illustration of another embodiment of the present invention.
Figure 5:
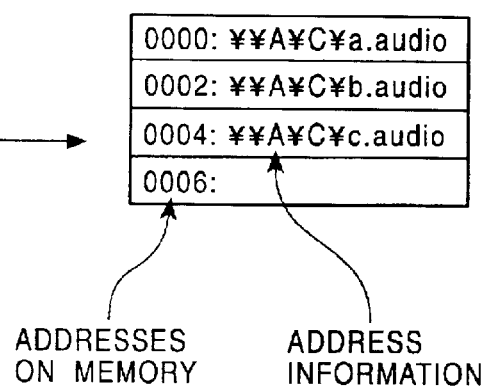

In the above embodiment, a case in which the display data is generated and retained based on the management data and serves for displaying the file names has been described. However, the present invention is not limited to the case. As shown in, for example, FIG. 5, in cases in which by selecting each predetermined-format file so that address information is recorded, only the file is displayed as its representation, and in which file names for use in sequential displaying by the above-described processing, in other words, by displaying the names of files belonging to a predetermined folder and the names of files belonging to a subfolder of the predetermined folder in a virtual form in which the files belonging to the predetermined folder and the names of the files belonging to the subfolder belong to a single folder, effects similar to those in the above embodiment can be obtained.

In the above embodiment, a case in which file names are used as representations of files has been described. However, the present invention is not limited to the case. For example, a representation of content such as a music name may be used as a representation of each file, and symbols, signs, etc., may be used as representations of files.

In the above embodiment, a case in which an MP3 file is selectively played back has been described. However, the present invention is not limited to the case, but may be widely applied to, for example, a case in which an adaptive transform acoustic coding (ATRAC) file is selectively played back, and further to a case in which an MP3 file or an ATRAC file is switched by the user and is selectively played back.

In the above embodiment, a case in which the layered structure of folders is virtually changed has been described. However, the present invention is not limited to the case. For example, when performing downloading from a hard disk drive to a recording medium, each file may be recorded in a form in which the layered structure has been actually changed. This case includes possibilities such as a case in which all folders are arranged in the current directory, and a case in which all files are recorded in the current directory without providing any folders.

In the above embodiment, a case in which the optical disk 12 is played back has been described. However, the present invention is not limited to the case, but may be widely applied to cases in which music content recorded in hard disk drive is played back, and in which music content is played back by accessing a server via communication means.

In the above embodiment, a case in which the present invention is applied to the car audio apparatus 1 and music content is played back has been described. However, the present invention is not limited to the case, but may be widely applied to various types of audio apparatuses, video units, and information processing apparatuses such as personal computers in cases in which music content, video content, etc., are played back.

What is claimed is:

1. A file management method for accessing recording means in which files are recorded in a layered structure, said file management method comprising:

an address-information acquisition step for acquiring from said recording means first information on the addresses in said layered structure of files belonging to a predetermined folder and second information on the addresses in said layered structure of files belonging to a subfolder of said predetermined folder;

a display step for, based on the first information and the second information, displaying representations of said files belonging to said predetermined folder and representations of said files belonging to the subfolder in a virtual form in which said files belonging to said predetermined folder and said files belonging to the subfolder belong to a single folder; and a selected-file acceptance step for using the screen displayed by said display step to accept a file selected from among said files belonging to said predetermined folder and said files belonging to the subfolder.

2. A file management method according to claim 1, wherein, in said address-information acquisition step, in the first information and second information on the addresses of the files, the first information and second Information on the address of each file having a predetermined format are selectively acquired.

3. A file management method according to claim 1, wherein, in said display step, from the representations of the files, the representation of each file having a predetermined format is selectively displayed.

4. A file management method according to claim 1, wherein, in said display step, the representations of the files are displayed so that the representations of files belonging to said single folder are sequentially arranged.

5. A file management method according to claim 4, wherein, in said display step, in preference to the representations of files belonging to another subfolder in a single layer, the representations of files belonging to a subfolder in a layer lower than said single layer are displayed.

6. A file management method according to claim 1, further comprising the step of sequentially accessing the files in the order of displaying the representations in said display step.

7. A program for performing a file management method for accessing recording means in which files are recorded in a layered structure, said file management method comprising:

an address-information acquisition step for acquiring from said recording means first information on the addresses in said layered structure of files belonging to a predetermined folder and second information on the addresses in said layered structure of files belonging to a subfolder of said predetermined folder;

a display step for, based on the first information and the second information, displaying representations of said files belonging to said predetermined folder and representations of said files belonging to the subfolder in a virtual form in which said files belonging to said predetermined folder and said files belonging to the subfolder belong to a single folder; and a selected-file acceptance step for using the screen displayed by said display step to accept a file selected from among said files belonging to said predetermined folder and said files belonging to the subfolder.

8. A recording medium containing a program for performing a file management method for accessing recording means in which files are recorded in a layered structure, said file management method comprising:

an address-information acquisition step for acquiring from said recording means first information on the addresses in said layered structure of files belonging to a predetermined folder and second information on the addresses in said layered structure of files belonging to a subfolder of said predetermined folder;

a display step for, based on the first information and the second information, displaying representations of said files belonging to said predetermined folder and representations of said files belonging to the subfolder in a virtual form in which said files belonging to said predetermined folder and said files belonging to the subfolder belong to a single folder; and a selected-file acceptance step for using the screen displayed by said display step to accept a file selected from among said files belonging to said predetermined folder and said files belonging to the subfolder.

9. A file management apparatus for accessing recording means in which files are recorded in a layered structure, said file management apparatus comprising:

address-information acquisition means for acquiring from said recording means first information on the addresses in said layered structure of files belonging to a predetermined folder and second information on the addresses in said layered structure of files belonging to a subfolder of said predetermined folder;

display means for, based on the first information and the second information, displaying representations of said files belonging to said predetermined folder and representations of said files belonging to the subfolder in a virtual form in which said files belonging to said predetermined folder and said files belonging to the subfolder belong to a single folder; and file-selecting step for using the screen displayed by said display means to accept a file selected from among said files belonging to said predetermined folder and said files belonging to the subfolder.

10. A file management apparatus according to claim 9, wherein the displayed representations of said files belonging to said predetermined folder and the displayed representations of said files belonging to the subfolder are representations of content which is data-compressed in a predetermined format.

11. A file management apparatus according to claim 9, wherein said file management apparatus is a car-mounted apparatus.

12. A file management method for downloading a desired file to a predetermined recording medium by accessing recording means in which file are recorded in a layered structure, said file management method comprising the steps of:

acquiring from said recording means first information on the addresses in said layered structure of files belonging to a predetermined folder and second information on the addresses in said layered structure of files belonging to a subfolder of said predetermined folder; and creating, based on the first and second information, folders respectively corresponding to said predetermined folder and the subfolder in a single layer in said recording medium, and recording on said recording medium files belonging to said predetermined folder and the subfolder.

* * * * *